March 24, 1953 J. F. ANDERSON Re. 23,633

NO-DRAFT ARM SIGNALING VEHICLE WINDOW

Original Filed Oct. 10, 1944

INVENTOR
JOHN F. ANDERSON
BY J. C. Fried
ATTORNEY.

Reissued Mar. 24, 1953

Re. 23,633

UNITED STATES PATENT OFFICE 23,633

NO-DRAFT ARM SIGNALING VEHICLE WINDOW

John F. Anderson, Oakland, Calif.

Original No. 2,557,065, dated June 19, 1951, Serial No. 558,003, October 10, 1944. Application for reissue August 22, 1951, Serial No. 243,120

5 Claims. (Cl. 296—44)

Matter enclosed in heavy brackets [ ] appears in the original patent but forms no part of this reissue specification; matter printed in italics indicates the additions made by reissue

This invention relates to motor vehicle windows and has for its object an improved window construction to enable the driver of the vehicle to give an "arm signal" at times when the window adjacent his signalling arm is closed to a degree which would ordinarily prevent use of the arm for signalling as when turning or stopping.

Particular features and advantages of the construction will appear in the following description and accompanying drawings.

In the drawing Fig. 5 is a perspective view of the front left corner of an automobile body fitted with my improved window and with the driver of the car shown in dotted position and as in the act of giving an arm signal through my window.

Figure 1:
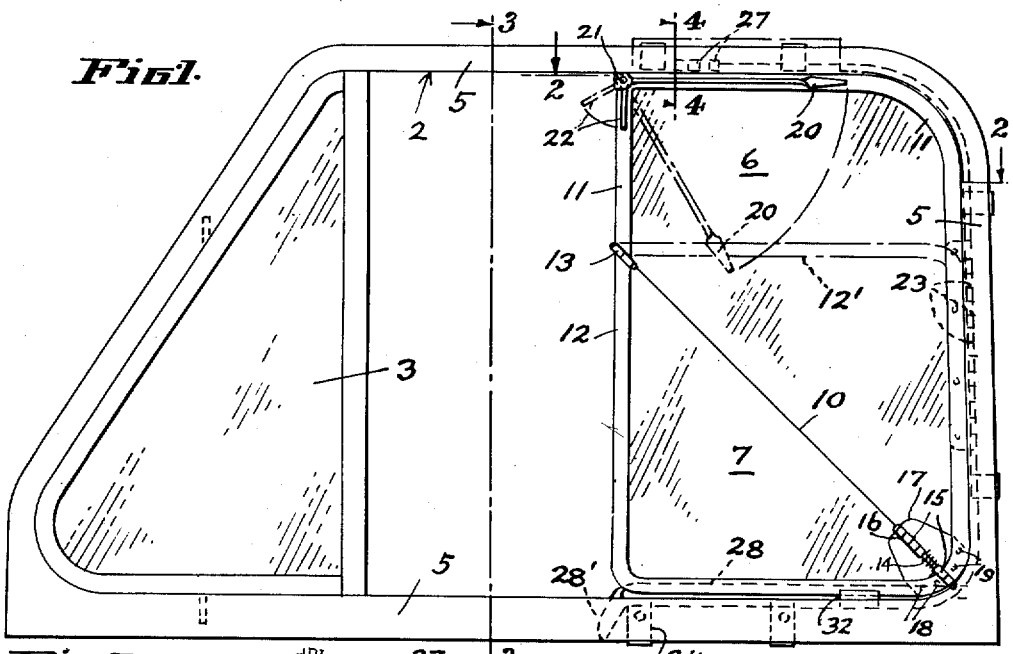
Fig. 1 is an enlarged side elevation of the left front window of the car of Fig. 5 showing a no-draft ventilating adjustment and with my signalling panel closed.

Briefly described my improvement comprises an extra anti-draft and arm signal facilitating panel of the general type shown in my Patent No. 2,182,107 except that it more effectually excludes objectionable drafts in being provided with a specially arranged pivotally mounted panel adapted to be pushed open by the arm in giving the signal. Also other features will appear in the description.

In further detail the drawing shows at 1 a portion of the body of an automobile, and with its front left window opening designated 2, the usual front side shield window panel 3, and with the main window glass or panel 4 lowered below the outer frame or margin 5 of the door in which the window is mounted.

With such a window and side shield arrangement, it is well known that with the main window panel lowered the passengers in the rear seat of the car, and sometimes the driver in the front seat, are subject to objectionable drafts of air which swirl around the side draft shield 3 and enter the open portion of the window notwithstanding any angular adjustment of the side shield, and it has been found advantageous in reducing such drafts to partially close the window opening by an auxiliary panel as shown in my previous patent mentioned, but under certain conditions of wind objectionable drafts still gained entrance.

In my preferred construction I also provide an auxiliary panel as of glass or other transparent material 6 arranged to cover about two-thirds of the open window space as measured from the rear of the window forward, but I further provide an angularly hinged section 7 to the panel 6 arranged to swing outwardly, rearwardly and upwardly when pushed against with the arm 8 of a driver 9 of the car when giving an arm signal, and which hinged section 7 will fall as the arm is pulled in again and automatically latch in vertical position in plane with the main section 6 of the auxiliary panel.

The swinging panel 7 makes an angular glass to glass close juncture with the main panel 6 along a line 10 preferably extending from the forward edge of the panel rearwardly and downwardly at about 45 degrees, and both sections of the panel 6 and 7 preferably have a channel shaped metal frame embracing their outer margins as indicated at 11 and 12 and to which the hinges 13 and 15 are secured, though the latter is a spring hinge provided with a small coil wire spring 14 arranged to exert a closing force on the panel section 7 to aid gravity in keeping it normally closed, and therefore this hinge is somewhat longer than hinge 13 and is preferably stabilized or reinforced as by a pair of metal plate extensions 16, 17 secured to the frames of their respective panel sections as by spot welding 18, 19 or otherwise.

The hinged section 7, if desired when traveling slowly or in warm weather, may be opened out flat against panel section 6 so as to bring its forward margin to the dotted position 12' and there latched in place as by pivoted latch arm 20 which normally rests along the outer side of the marginal frame 11 of the main panel 6 and is pivoted thereto as at 21 and has a finger lever operating portion 22 normally lying vertically along the forward or vertical margin of frame 11. Pivot joint 21 provides sufficient friction to hold the light weight latch lever 20 in upper position when not in use.

Figure 3:
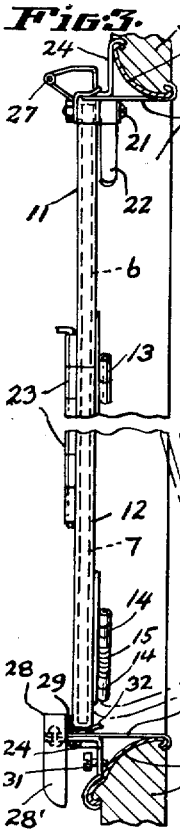
Fig. 3 is an enlarged vertical cross-section of Fig. 1 taken along the line 3—3 of Fig. 1.
Figure 2:
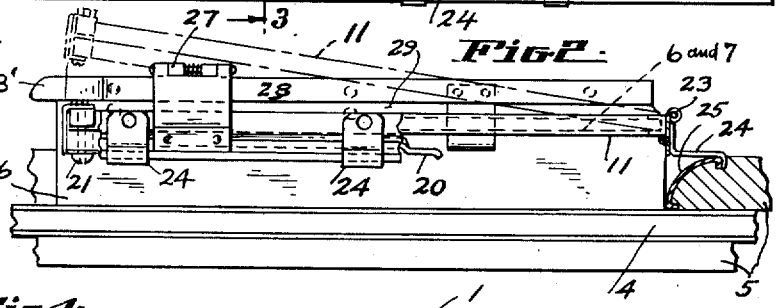
Fig. 2 is a still further enlarged view showing a cross-sectional portion of Fig. 1 taken along the line 2—2 of Fig. 1.
Figure 4:
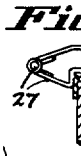
Fig. 4 is an enlarged sectional detail of the main panel latch as seen from the line 4—4 of Fig. 1.
Figure 5:
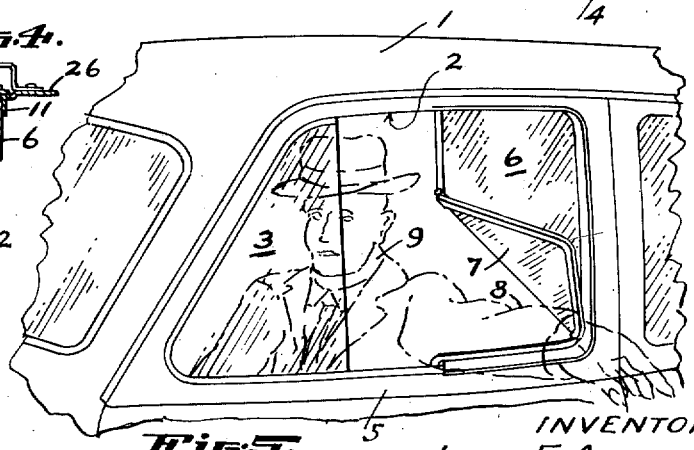

In Fig. 2 the relative position of my special panels to the main window will be seen, and in which figure the main window glass 4 is shown as lowered within the framework 5 of the door and my panels lying in a plane as shown in dotted lines 6 and 7 and also in which the frame 11 of the main panel section 6 is itself shown piano hinged as at 23 to an auxiliary frame 26 in turn secured to the door frame 5 so that the whole panel assembly 6 and 7 can swing as a unit inwardly (as indicated in dotted lines) and backwardly to a position substantially against the inner side wall of the car, as may be desired in hot weather when the car is standing, or to facilitate cleaning of the panels 6 and 7 and/or the inner side of the main window 4 when raised to closed position. The auxiliary frame 26 is preferably of sheet metal and provided with spaced brackets 24 firmly clamped and/or soldered or otherwise secured to the margin of the metal molding or facing 25 of the main window opening. This auxiliary frame embraces the upper, lower, and rear edges of the framed panels 6 and 7 as indicated in the drawing and the framed panels 6 and 7 are normally held in place as by a spring latching clip 27 as shown best in Fig. 3 and separate detail Fig. 4, and which can be released by upward pressure of the finger when it is desired to swing the panels inward into the car after first swinging lower panel 7 outward a trifle to clear an inner fixed stop rail 28 faced with a sealing strip 29 against which the lower run of frame 12 of panel 7 normally seats when closed. This rail 28 curves downwardly at its forward end as at 28' to function as a guard against the sleeve of the signalling arm getting under the panel in closing. The securing brackets 24 may be provided with positioning screws 31 for drawing them tightly against moulding strips 25 around the edges of which the brackets preferably have hooking engagement as best shown in Fig. 3.

Also to be noted is that a spring latch plate 32 is provided on the lower run or sill of auxiliary frame 26 to resiliently latch the outwardly swinging panel 7 when in closed position, though yield easily when the hand or arm presses the panel outward to give the arm signal.

Having thus described my improved arm signaling window and the manner of its use, it will be evident that while its most useful purpose will be in association with the regular sliding window of an automobile door, still it may entirely supplant the main window for it is evident that the relatively fixed panel 6 may close off as much of the window space as desired, and the angularly hinged panel 7 may be of any size.

*Numerous modifications and variations of the present invention will occur to those skilled in the art after a careful study hereof. All such properly within the spirit, teachings and scope hereof are intended to be included and comprehended as fully as if specifically described, illustrated and claimed herein.*

*It should be noted that the method of mounting the auxiliary arm signaling window of the present invention in a position across at least a portion (usually a rear portion) of a vehicle window inward of the usual slidable glass pane provided in such windows, may take a number of forms and need not necessarily be pivotal. The latch means 20 and the downwardly curved end 28' of the rail may be modified substantially or eliminated entirely in certain forms of the present invention. The stop means described and illustrated herein may be modified substantially as may the biasing spring means, which under certain circumstances may be eliminated entirely. The exact structure, configuration, relative positioning and composition of the various component parts of the present invention are not limited to the specific forms described and illustrated but may be modified within the spirit and teachings hereof.*

*The embodiment of the present invention specifically described, illustrated and claimed herein is exemplary only and is not intended to limit the scope of the present invention, which is to be interpreted in the light of the prior art and the appended claims only, with due consideration for the doctrine of equivalents.*

I therefore claim:

1. In an arm signalling window of the character described, a relatively fixed upper window pane section and a lower pane section hingedly connected to the fixed section in a manner to swing outwardly to permit extension of the arm for signalling, the hinged joint of the sections being diagonally at an angle slanting downwardly from the forward edge of the fixed section and rearwardly with respect to a vehicle in which the window is used and whereby the hinged section swings outwardly, rearwardly, and upwardly in opening, an auxiliary frame in which the sections are mounted, means hinging the sections to swing as a unit inwardly of said frame, and brackets on said frame adapted for securing to the edges of an automobile window frame spaced inward sufficiently so as not to interfere with existing vertically sliding windows already installed.

2. In an arm signalling window of the character described, a relatively fixed upper window pane section and a lower pane section hingedly connected to the fixed section in a manner to swing outwardly to permit extension of the arm for signalling, the hinged joint of the sections being diagonally at an angle slanting downwardly from the forward edge of the fixed section and rearwardly with respect to a vehicle in which the window is used and whereby the hinged section swings outwardly, rearwardly, and upwardly in opening, and an inner stop rail for the hinged section extended to form a sleeve guard curved downwardly at its forward end.

3. In an automobile arm signalling window having a fixed upper window pane section with a lower pane section hinged thereto to swing outwardly and upwardly to permit extension of the arm for signalling, a latch arm pivotally mounted at one end on the upper forward margin of the upper pane in a manner to have its free end swing downward to engage the upper margin of the pivoted pane when open, said arm provided with an operating handle portion extending adjacent the forward margin of the fixed upper pane and there accessible from within the vehicle, all in a manner to hold the lower pane in open position substantially flat against the outer side of the upper pane when the handle portion is turned.

*4. An auxiliary no-draft vehicle arm signaling window adapted to be mounted in the window of a vehicle for virtually eliminating drafts entering the body of the vehicle through the window, while freely permitting the arm of an individual positioned inside the window to be extended outwardly to a position exterior of the vehicle for signaling purposes, comprising: an upper window pane section and a lower window pane section hingedly connected to the upper section in a manner to swing outwardly, upwardly and rearwardly to permit extension of the arm of a person on the inside of the window pane section to a position outside of said window pane section for signaling purposes, the hinged connection of the sections being diagonally positioned at an angle slanting downwardly and rearwardly from the forward edge of the upper*

*section with respect to the direction in which a vehicle carrying the window is intended to travel, whereby the hinged lower section swings outwardly, rearwardly and upwardly in opening; and mounting means including auxiliary frame means in which the sections are mounted, and bracket means on said frame means adapted for securing to the edges of an automobile window frame whereby to support both the upper and lower window pane sections in a position across at least a portion of the vehicle window inward of the usual slidable glass pane provided in such windows so as not to interfere with its operation.*

*5. An auxiliary no-draft vehicle arm signaling window adapted to be mounted in the window of a vehicle for virtually eliminating drafts entering the body of the vehicle through the window, while freely permitting the arm of an individual positioned inside the window to be extended outwardly to a position exterior of the vehicle for signaling purposes, comprising: an upper window pane section and a lower window pane section hingedly connected to the upper section in a manner to swing outwardly, upwardly and rearwardly to permit extension of the arm of a person on the inside of the window pane section to a position outside of said window pane section for signaling purposes, the hinged connection of the sections being diagonally positioned at an angle slanting downwardly and rearwardly from the forward edge of the upper section with respect to the direction in which a vehicle carrying the*

*window is intended to travel, whereby the hinged lower section swings outwardly, rearwardly and upwardly in opening inner stop means for the hinged lower window pane section to align said lower section with the upper section when said hinged lower section is closed; and mounting means including auxiliary frame means in which the sections are mounted, and bracket means on said frame means adapted for securing to the edges of an automobile window frame whereby to support both the upper and lower window pane sections in a position across at least a portion of the vehicle window inward of the usual slidable glass pane provided in such windows so as not to interfere with its operation.*

JOHN F. ANDERSON.

REFERENCES CITED

The following references are of record in the file of this patent or the original patent:

UNITED STATES PATENTS

| Number | Name | Date |
|---|---|---|
| 1,606,675 | Tasman | Nov. 9, 1926 |
| 1,636,705 | Mosher | Oct. 9, 1928 |
| 1,721,223 | Kern | July 16, 1929 |
| 1,753,795 | Linn et al. | Apr. 8, 1930 |
| 1,809,132 | Martin | June 9, 1931 |
| 1,909,639 | Smith et al. | May 16, 1933 |
| 2,061,689 | Wilson | Nov. 24, 1936 |
| 2,171,801 | Morrison | Sept. 5, 1939 |
| 2,182,107 | Anderson | Dec. 5, 1939 |